(12) United States Patent
Loveland et al.

(10) Patent No.: US 8,429,743 B2
(45) Date of Patent: Apr. 23, 2013

(54) ONLINE RISK MITIGATION

(75) Inventors: Shawn Loveland, Sammamish, WA (US); Geoffrey J Hulten, Lynnwood, WA (US); Elliott Jeb Haber, Fall City, WA (US); John L. Scarrow, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 700 days.

(21) Appl. No.: 12/342,981

(22) Filed: Dec. 23, 2008

(65) Prior Publication Data

US 2010/0162391 A1 Jun. 24, 2010

(51) Int. Cl.
*G06F 21/00* (2006.01)

(52) U.S. Cl.
USPC .................. 726/22; 709/200; 705/7; 711/161

(58) Field of Classification Search .................... 726/22, 726/24
See application file for complete search history.

(56) References Cited

U.S. PATENT DOCUMENTS

| | | | | |
|---|---|---|---|---|
| 7,069,401 B1* | 6/2006 | Noonan et al. | | 711/162 |
| 7,076,797 B2* | 7/2006 | Loveland | | 726/4 |
| 7,490,353 B2* | 2/2009 | Kohavi | | 726/22 |
| 7,831,787 B1* | 11/2010 | Yueh | | 711/161 |
| 7,849,502 B1* | 12/2010 | Bloch et al. | | 726/11 |
| 7,849,507 B1* | 12/2010 | Bloch et al. | | 726/22 |
| 7,895,651 B2* | 2/2011 | Brennan | | 726/22 |
| 8,010,667 B2* | 8/2011 | Zhang et al. | | 709/224 |
| 8,196,205 B2* | 6/2012 | Gribble et al. | | 726/24 |
| 8,205,239 B1* | 6/2012 | Satish | | 726/1 |
| 8,230,500 B1* | 7/2012 | Spertus et al. | | 726/22 |
| 8,239,654 B2* | 8/2012 | Ignatius et al. | | 711/202 |
| 8,312,537 B1* | 11/2012 | Nachenberg et al. | | 726/22 |
| 2002/0069369 A1* | 6/2002 | Tremain | | 713/201 |
| 2004/0172557 A1* | 9/2004 | Nakae et al. | | 713/201 |
| 2006/0129627 A1* | 6/2006 | Phillips et al. | | 709/200 |
| 2007/0136579 A1* | 6/2007 | Levy et al. | | 713/168 |
| 2007/0198718 A1* | 8/2007 | Savoor et al. | | 709/226 |
| 2008/0022384 A1* | 1/2008 | Yee et al. | | 726/11 |
| 2008/0133540 A1* | 6/2008 | Hubbard et al. | | 707/10 |
| 2008/0229415 A1* | 9/2008 | Kapoor et al. | | 726/22 |
| 2009/0249005 A1* | 10/2009 | Bender et al. | | 711/162 |
| 2009/0282477 A1* | 11/2009 | Chen et al. | | 726/22 |
| 2010/0077445 A1* | 3/2010 | Schneider et al. | | 726/1 |
| 2011/0047618 A1* | 2/2011 | Evans et al. | | 726/23 |
| 2011/0202763 A1* | 8/2011 | Martin et al. | | 713/165 |

OTHER PUBLICATIONS https://www.barracudanetworks.com/docs/admin_guides/barracuda%/20backup_ag_us.pdf|Barracuda Networks, Inc|2004|pp. 1-71.*

\* cited by examiner

*Primary Examiner* — Taghi Arani
*Assistant Examiner* — Mahfuzur Rahman
(74) *Attorney, Agent, or Firm* — Wolfe-SBMC

(57) ABSTRACT

Online risk mitigation techniques are described. In an implementation, a service is queried for a reputation associated with an object from an online source in response to selection of the object. A backup of a client that is to receive the object is stored prior to obtaining the object when the reputation does not meet a threshold reputation level.

18 Claims, 5 Drawing Sheets

ONLINE RISK MITIGATION

BACKGROUND

Computer networks allow users to exchange programs and data, such as applications and web content. For example, a user may surf the Internet to find an application that is of interest. However, as the Internet's popularity and size have increased, some users have taken to providing malware via the Internet. Malware includes programs or applications that are designed to perform tasks that are malicious in nature and typically are not made known to a user. While some malware may result in user annoyance (e.g., permitting popup advertising), malware may also include computer viruses that can destroy data, tie-up computing resources, and so on.

Since malware's malicious nature may be hidden, malware may be spread from computer to computer. Users may not even know that the user's computer is infected with malware until the computer shows symptoms, e.g., stops functioning, sends unauthorized emails, and so on. Although a computer may be restored its manufactured configuration to do so may be time consuming and result in data loss. Thus, a user may spend significant amount of time resolving issues once the user's computer is infected with malware.

SUMMARY

Online risk mitigation techniques are described. In an implementation, a service is queried for a reputation associated with an object from an online source in response to selection of the object. A backup of a client that is to receive the object is stored prior to obtaining the object when the reputation does not meet a threshold reputation level.

In an implementation, a system includes a reputation module and a backup module. The reputation module is to query a service for a reputation associated with an object requested in an online session by a client. The backup module is to automatically create a virtual environment to isolate the object from a backup of data of the client. The virtual environment is created in response to a determination by the reputation module that the reputation does not meet a threshold reputation level. The backup is stored prior to reception of the object.

In an implementation, one or more computer-readable media include instructions that are executable to query for a reputation associated with web content that is designated by a uniform resource locator (URL). The query occurs before the web content is accessed. The mitigation service stores a backup of data of the client that is used to restore the client to a state before the web content was accessed. The mitigation service stores the backup when the reputation obtained by the query does not meet a threshold reputation level for the client.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The exchanging of objects, such as content and applications, over a network may expose a user's computer to malware. Consequently, users may forego exchanging objects in order to avoid compromising the computer.

Techniques are described to minimize online risk. In an implementation, a reputation module queries a reputation service for a reputation associated with an object. For example, in response to selection of a uniform resource locator (URL) that points to a webpage, the reputation module may query the reputation service for a reputation associated with web content included on the webpage. An object's reputation may indicate how likely the object is to include malware. A backup client data may be stored when the reputation does not meet a threshold reputation level. Additionally, a notification may be sent that the object does not meet the threshold reputation level.

Further, in an implementation, a virtual environment is created to isolate an object that has a reputation that does not meet a threshold reputation level. For example, the backup module may automatically create a virtual environment to isolate a web browser that is visiting a website that has content that does not meet the threshold reputation level.

In the following discussion, an example environment is first described that is operable to perform one or more techniques that may be use to mitigate online risk. Example procedures are then described which may be implemented using the example environment as well as other environments. Accordingly, implementation of the procedures is not limited to the example environment and the example environment is not limited to implementation of the example procedures.

Example Environment

Figure 1:
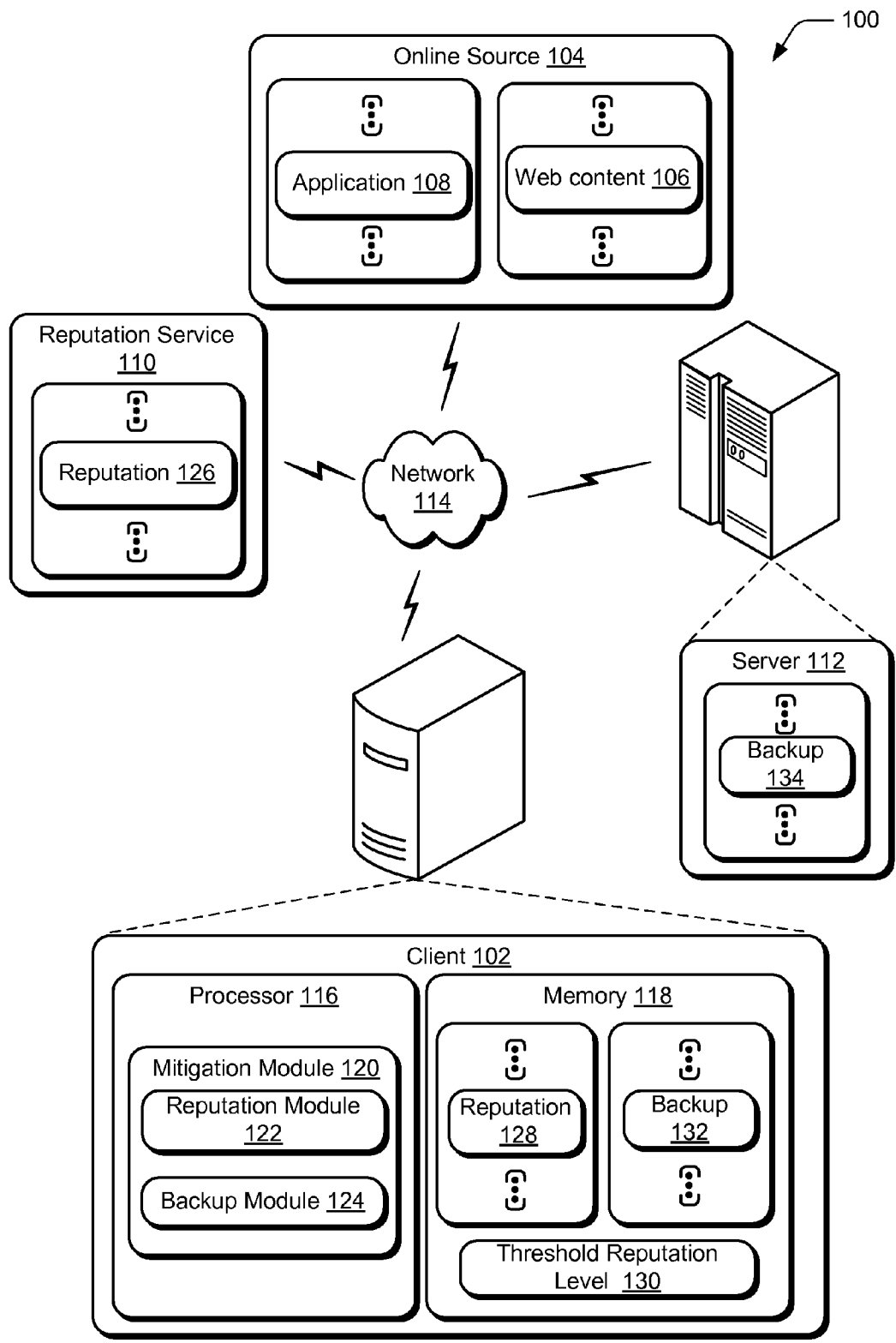
FIG. 1 is an illustration of an environment in an example implementation that is operable to perform online risk mitigation techniques.

FIG. 1 is an illustration of a environment 100 in an example implementation that is operable to employ online risk mitigation techniques. The illustrated environment 100 includes a client 102, an online source 104 having objects, a reputation service 110, and a remote data storage system (illustrated as a server 112) communicatively coupled by a network 114. Remote data storage may be provided by a wide variety of devices, such as network attached storage. As illustrated the online source 104 provides one or more of web content 106 or applications 108. While web content 106 and applications 108 are discussed, objects may include one or more of programs, plug-ins, applets, files containing macros, and so forth.

Although the network 114 may be the Internet, the network 114 may assume a wide variety of configurations. For example, the network 114 may include a wide area network (WAN), a local area network (LAN), a wireless network, a public telephone network, an intranet, and so on. Further, although a single network 114 is shown, the network 114 may be configured to include multiple networks. For instance, the client 102 and the server 112 may be communicatively coupled via a local network (e.g., a desktop workstation connected to the server) to communicate, one to another. A wide variety of other instances are also contemplated.

The client 102 may be configured in a variety of ways. For example, the client 102 may be configured as a computing system that is capable of communicating over the network 114, such as a desktop computer, a mobile computer, and so forth. Thus, the client 102 may range from a full resource device with substantial memory and processor resources (e.g., personal computers) to a low-resource device with limited memory and/or processing resources, e.g., a personal digital assistant (PDA).

The client 102 is further illustrated as including a processor 116 and memory 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 118 is shown, a wide variety of types and combinations of memory may be employed, such as random access memory (RAM), hard disk memory, removable medium memory, and other types of computer-readable media.

A mitigation module 120 is illustrated as being executed on the processor 116. The mitigation module 120 is representative of functionality to determine a reputation 126 associated with the object. When the reputation 126 does not meet a threshold reputation level 130, the mitigation module 120 may store a backup 132 of the client 102. Although the backup 132 is referenced, the mitigation module 120 may store various backups in a variety of locations. For example, the mitigation module 120 may store a copy of the backup locally in the memory 118 and/or remotely, such as a backup 134 on the server 112. The mitigation module 120 may use the backup to restore the client 102 to a state before the client 102 was infected with malware. Thus, the mitigation module 120 may utilize the backup 132 to "rollback" the client 102 to the state before the object was received.

The mitigation module 120 is illustrated as including modules that are representative of specific functionality for clarity in the discussion. For example, the mitigation module 120 is illustrated as including a reputation module 122 and a backup module 124. The reputation module 122 is representative of functionality operable to query the reputation service 110 for a reputation 126 associated with an object such as from the online source 104. An object's reputation may indicate how likely an object is to include malware.

While the reputation service 110 is depicted as a stand-alone service, the reputation service 110 may be configured in a variety of ways. For example, the reputation service may be included on the client 102, included on a networked server and the client 102, and so forth. In another implementation, the client 102 may obtain the reputation 126 via a third party. For example, the client 102 may receive the reputation 126 from the server 112.

In some implementations, the reputation module 122 may cache the reputation 128 in the memory 118. This may be done to speed-up the determination as to whether the object meets the threshold reputation level 130. For example, the reputation module 122 may obtain reputations for objects associated with a website that is located by a search engine. In this way, the client 102 may have the applicable reputations available when the website is selected.

In an implementation, the reputation module 122 is configured to determine whether the reputation 126 meets a threshold reputation level 130. In some instances the reputation 126 and threshold reputation level 130 may be expressed as numerical values. Thus, the reputation module 122 may determine whether the reputation 126 meets the threshold reputation level 130 by comparing the values for the object and the threshold reputation level 130.

While the threshold reputation level 130 may be set for the client 102, the threshold reputation level 130 may vary based on a variety of factors. Example factors include, but are not limited to, what user is logged on, object type, search terms, and so on. Likewise, the reputation module 122 may implement an algorithm to calculate the threshold reputation level 130, employ heuristic techniques, accept user input, and so on to determine the threshold reputation level 130.

In at least some embodiments, the reputation module 122 sends a notification to alert a user to the object's reputation. For example, the reputation module 122 may send the user a notification. The notification may also include related information (e.g., source, reported problems) and so forth. The reputation module 124 may also request authorization to obtain the object from a website.

In some implementations, the reputation module may also be configured to proactively recommend rolling back to a particular backup. For example, the reputation module may send a notification that recommends that the client be restored using a particular backup based on activity that indicates the client is infected with malware, on new information, and so on.

The backup module 124 is representative of functionality to store a backup of data of the client 102. In an implementation, the backup may occur prior to the client 102 obtaining the object. For example, the backup may occur based on whether a reputation for the object meets the reputation threshold level. For instance, before a user browses to a website that includes objects having a "poor reputation" (in comparison to the threshold reputation level), the backup module 124 may capture the client's state. Thus, if the website content contains malware, the backup module 124 may use the backup 132 to recover the data of the client 102. In this way, the backup module 124 may use the backup to roll back configuration information, programs, and so on to a time just before the object was received by the client. The backup 132 may be stored locally in the memory 118 and/or remotely on the server 112, e.g., backup 134. In another example, the backup module 124 may store an incremental backup that saves changes to data made to the client 102 since a previous backup 132.

In one or more embodiments, the backup module 124 may be configured to isolate online activities and/or the backup 132, one from another. The backup module 120 may do this to protect the backup 132 from malware or other malicious code. For example, the backup module 124 may isolate the data forming the backup 132 based on the object's reputation 126. To isolate the backup 132, the backup module 124 may take one or more actions based on the object's reputation 126.

For instance, the backup module 124 may isolate the data forming the backup 132 locally on a partitioned portion of a hard drive. The backup module 124 may encrypt the backup 132 or store the backup 134 remotely. In addition, the backup module 124 may store the backup 132 locally, create a virtual environment for the online session, and/or permit the online session to run in a native operating system (OS). The backup module 124 also may isolate the online session in a virtual machine. The backup module 124 also may perform combinations of the above actions, and so forth.

By way of example for discussion purposes alone and not limitation, presume that the reputation 126 is expressed as a reputation value that may range from one to five. In this example, five may represent objects associated with a "known good reputation" and one may represent a "known bad reputation." When a user attempts to access a plug-in having a reputation value of five, the backup module 124 may permit the session to run in the native OS. In contrast, when the plug-in is associated with a reputation value of two, the backup module 124 may store the backup 134 remotely and create a virtual environment for the online session.

In embodiments, the backup module 124 may send a notification that the backup 132 is available for use in recovering the client 102. For example, the backup module 124 may send a notification to alert a user of the backup 132. The notification may be sent at the end of the online session or in response to receiving a logoff request. Other suitable times include, but are not limited to, at an arbitrary point in time (e.g., one day after the backup was made) or upon an occurrence of an event that indicates malware infection. For example, when popup advertisements appear in the client's browser. A variety of other examples are also contemplated.

Although the mitigation module 120 is discussed as being resident on the client 102, in further implementations the functionality provided by the mitigation module 120 may be provided as a mitigation service by a third party device on behalf of the client 102. For example, a mitigation service may be provided in conjunction with the reputation service 110 functions described herein over the network 114. In another example, the server 112 may be configured to provide mitigation service functions perform the mitigation module 120.

In one or more embodiments, an advertising model may be used to support mitigating client online risk. For example, the client 102 may be served an advertisement as part of storing a backup, sending a notification, and so forth.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, such as the memory 118. The features of the online risk mitigation techniques described herein are platform-independent, meaning that the techniques may be implemented on a variety of commercial computing platforms having a variety of processors.

Figure 2:
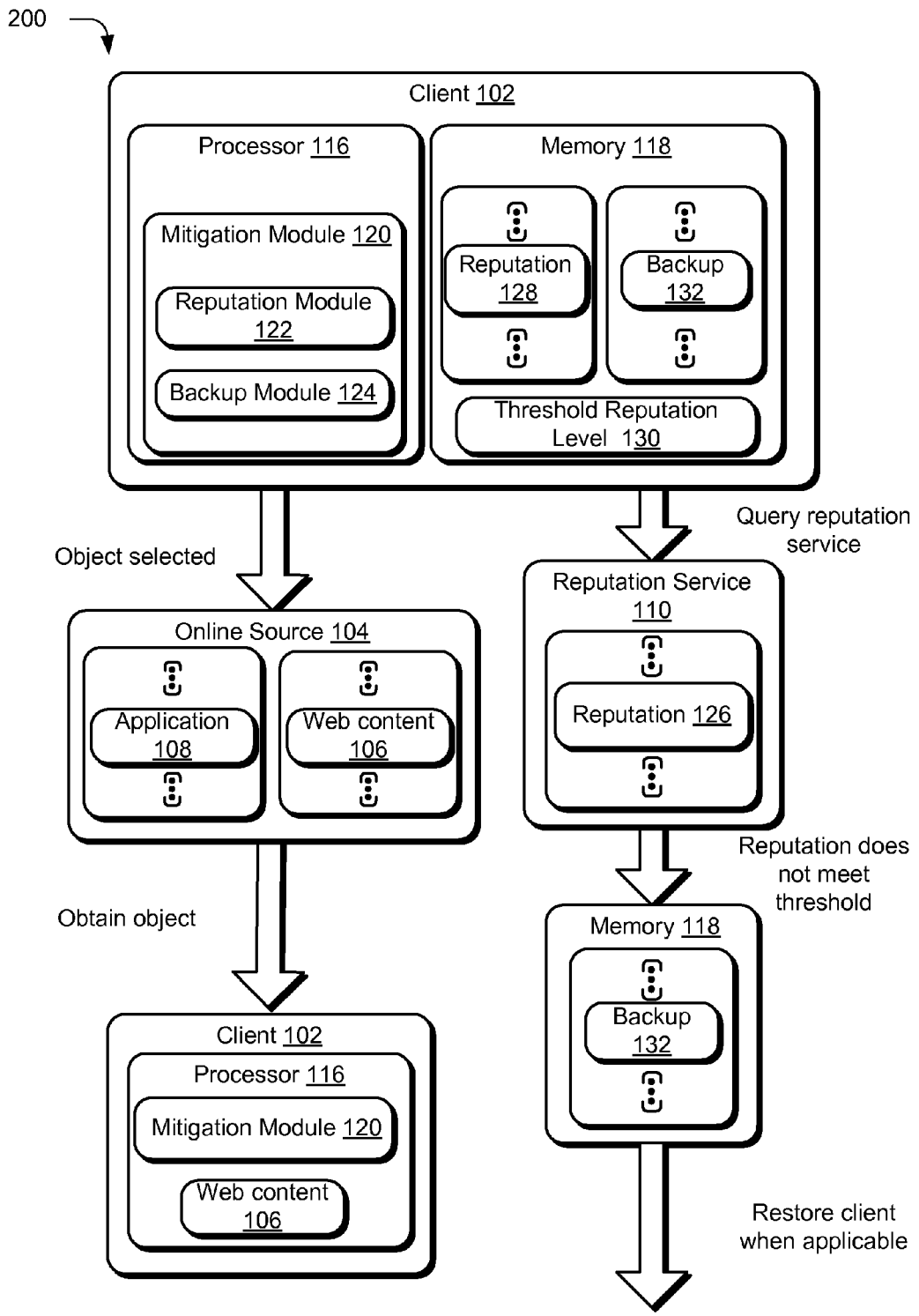
FIG. 2 is an illustration of a system in an example implementation in which the mitigation module of FIG. 1 is shown in greater detail.

FIG. 2 depicts a system 200 in an example implementation in which the backup 132 is stored using the mitigation module 120 of FIG. 1. For example, the reputation module 122 may query the reputation service 110 for the reputation 126 of an application 108 selected for downloading from a website. The reputation module 122 may check the reputation 126 with an applicable threshold reputation level 130. The reputation module 122 may check to see if the reputation 126 meets the threshold reputation level 130 that corresponds to the client 102, a type of object being downloaded, and so forth.

In a further example, the reputation module 122 may calculate an applicable threshold reputation level based on the object, the object type, other object related information, user information, and so forth. For instance, the reputation module 122 may heuristically determine what threshold reputation level is to be applied as part of the querying the reputation service 110.

As noted above, the reputation module 122 may make the query at various times. For example, the reputation module 122 may query the reputation service 110 in response to selection of the object, when a website containing the object is located by a browser's search engine, when a webpage that references the object is accessed, and so forth. In another example, the reputation module 122 may obtain the reputation 126 when a uniform resource locator (URL) is selected that points to a webpage.

The backup module 124 may store a backup of the client 102 when the reputation 126 reported by the reputation service 110 does not meet the threshold level. For example, if content on a website does not meet the threshold reputation level 130, the backup module 124 may store the backup 132 in memory 118. The backup 132 may be stored locally and/or remotely, such as on the server 112, network attached storage.

The backup 132 may be isolated in a variety of ways. For example, data included in the backup 132 may be stored in a partitioned portion of a hard drive. Isolating the backup 132 may implement other protection techniques. Isolation techniques include encrypting the backup 132, not linking to the backup 132, isolating data forming the backup 132 in a virtual machine, storing the backup 134 remotely, and so on.

In a further example, the backup module 124 may implement different techniques, combinations of techniques, and so forth based on circumstances associated the object's reputation 126. For example, the backup module 124 may store a backup 132 locally for objects associated with a domestic online source. In contrast, the backup module 124 may store the backup 134 remotely when the object is from a foreign online source. In a further example, a retention policy that indicates how long the backup is to be stored may be based on the reputation level for the object. Thus, for example, a backup for an object having a "poor" reputation may be stored for a longer period of time than a backup for a "questionable" reputation.

In some implementations, the object is not obtained until the backup 132 has been stored. For example, the client 102 does not download a plugin until the backup 132 is completed. In other instances, the object may be temporarily isolated on the client 102 until the backup 132 is complete. For example, the object may be isolated in a portion of the memory 118 while the backup 134 is stored in another portion of memory 118. Other scenarios are also contemplated. For example, a portion of the object (e.g., an inoperable portion) may be received while the backup 132 is being stored.

While an object having a reputation has been discussed, in other implementations the techniques and approaches may be used for objects that are not associated with a reputation. For example, the backup 132 may be made when the selected object does not have a reputation, e.g., is newly posted on the Internet. Thus, while an object that has a reputation and/or is associated with a reputable online source may not trigger a backup, a recently posted object may be automatically associated with a particular reputation until some condition is met (e.g., a time interval, an occurrence of an event (no reported malware), and so forth). By mapping "known" good objects, those objects that do not have a "known" good status may be treated as if reputation were bad, e.g., did not meet the threshold reputation level.

Figure 3:
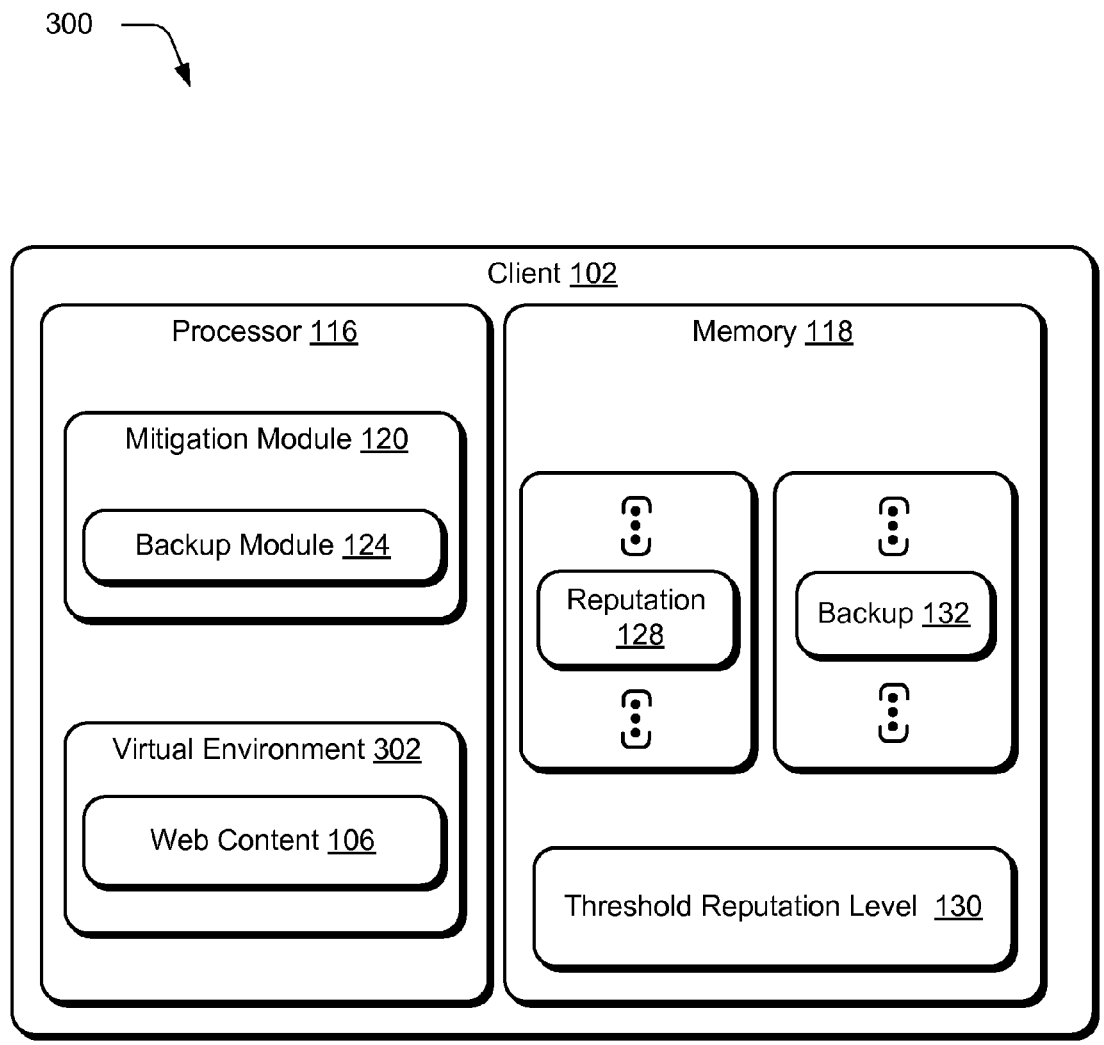
FIG. 3 is an illustration of a system in an example implementation showing a virtual environment.

FIG. 3 depicts a system 300 in an example implementation in which a virtual environment 302 contains an online session for the client 102. As illustrated, the online session includes web content 106 that may obtained from the online source 104 (e.g., a website) of FIG. 1. The virtual environment 302 may be created in response to a determination that the reputation 126, associated with the web content 106, does not meet the threshold reputation level 130.

Although a common threshold reputation level may be used for triggering backup storage and creating a virtual environment 302, in other instances separate threshold levels may be used. For example, the virtual environment 302 may be created at higher threshold reputation level than the threshold reputation level 130 that triggers the backup 132. In an implementation, the reputation levels at which backup storage and virtual environment 302 creation are triggered may be related, e.g., proportionally related.

The backup module 124 may create a virtual environment 302 to contain the online session when the reputation 126 associated with a selected object does not meet the threshold reputation level 130. Thus, when a user selects to download web content 106, the backup module 124 may create the virtual environment 302 for the web content 106. The virtual environment 302 may isolate the web browser from the native OS that is executing on the client 102. Although the virtual environment 302 may protect the client 102 from malware, in some instances the virtual environment 302 may limit access to drivers and resources that are available on the native OS. Therefore, configuring the mitigation module 120 to conditionally determine when to create a session in a virtual environment 302 may minimize online risk while permitting objects with a good reputation to run on the client's native OS.

In an implementation, the virtual environment 302 is discarded when the online session or other interaction with the object is completed. For example, the virtual environment 302 may be discarded when a downloaded application 108 is closed. The backup module may discard the virtual environment upon an occurrence of an event (e.g., until the client is shut down), after a specified amount of time, and so on.

The structures, techniques, and approaches used to create a virtual environment 302 may be used in combination with the structures, techniques, and approaches discussed with respect to FIGS. 1 and 2. A variety of other examples of online risk mitigation are also contemplated, further discussion of which may be found in relation to the following procedures.

Example Procedures

The following discussion describes online risk mitigation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200, 300 of FIGS. 2 and 3, respectively.

Figure 4:
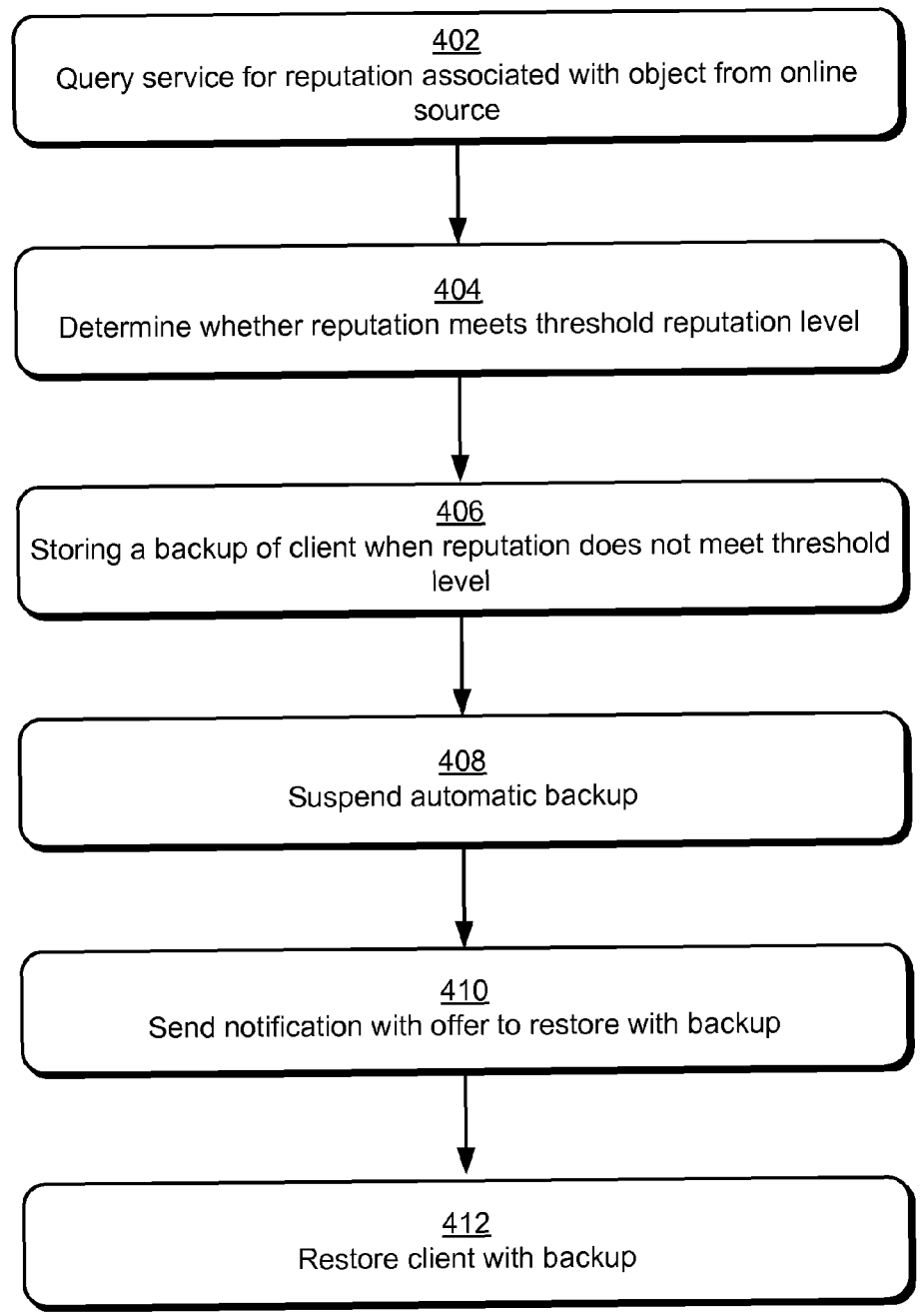
FIG. 4 is a flow diagram depicting a procedure in an example implementation in which a backup of a client is stored in response to a determination that an object has a reputation that does not meet a threshold reputation level.

FIG. 4 depicts a procedure 400 in an example implementation in which online risk mitigation procedures are used for an object that has a reputation that does not meet a threshold reputation level. Although the procedures are discussed for the client 102, a third party device may perform the procedures on behalf of the client 102.

A reputation service is queried for a reputation associated with an object (block 402). For example, the reputation module 122 may query the reputation service 110 when a user "clicks" on a graphical representation of the object.

A determination is made whether the reputation for the object meets the threshold level (block 404). For example, the reputation module 122 may check whether the object's reputation 126 meets the applicable threshold reputation level 130. In an example, the reputation module 122 may calculate the threshold reputation level 130 based on one or more of the object type, user information, data associated with the object, combinations of the foregoing, and so forth.

A backup is made when the reputation of the object does not meet the threshold reputation level (block 406). For instance, the backup module 124 may store the backup 132 locally and/or remotely (such as on the server 112). The backup 132 may represent a state of the client 102 at a time before the object is received. In embodiments, data forming the backup 132 may be isolated in a partitioned portion of a hard drive, stored on a remote computer, stored on an external drive (e.g., on a universal serial bus solid state drive), encrypted, or the like to protect the backup 132 from potential infection.

In one or more embodiments, an automatic backup of the client is suspended (block 408). For example, the automatic backup scheduled for client 102 may be halted when the client 102 is scheduled to perform a backup during the online session. Thus, once the backup 132 is made, a scheduled (e.g., standard) backup may be suspended until the online session is terminated, a downloaded application 108 is closed, or the like.

A notification is sent that offers to restore the client with the backup (block 410). The notification may be sent as a popup that offers to restore the client to the state represented in the backup 132. The notification may be sent at various times as previously described. In a further example, when multiple backups using the procedure 400 are made, the notification may identify a time associated with the backup 132. The backup may then be used to restore the client to a state corresponding to before the object was received (block 412). A variety of other examples are also contemplated without departing from the spirit and scope thereof.

Figure 5:
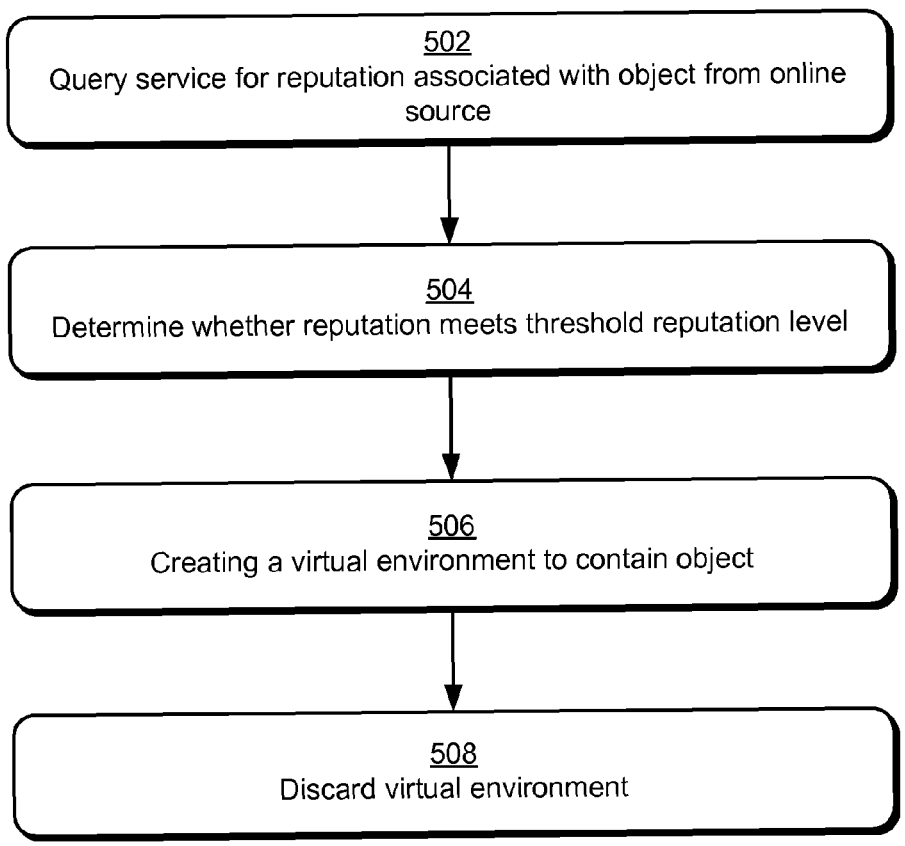
FIG. 5 is a flow diagram depicting a procedure in an example implementation in which a virtual environment is created when an object has a reputation that does not meet a threshold reputation level.

FIG. 5 depicts a procedure 500 in an example implementation in which a virtual environment is used to contain an object. For example, an online session may be performed in the virtual environment 302 to limit exposure to malware, such as computer viruses and the like. The use of a virtual environment 302 may be triggered based on a reputation associated with the object. The procedure 500 may be used in conjunction with the procedure 400.

The reputation service is queried for a reputation associated with the object (block 502). A determination is made whether the object's reputation meets a threshold level (block 504). In an example, the threshold level may be calculated based on factors associated with the object, user, and so on. Although a common threshold reputation level may be used for determining whether to store the backup 132 and create the virtual environment 302, in some examples separate threshold reputation levels are used. A virtual environment is created when the object's reputation does not meet the threshold reputation (block 506). For example, the backup module 124 may use a program that creates a virtual environment 302 for the application 108 downloaded from the web. In this way, the application 108 can be executed while isolating the remainder of a client performing the procedure 500.

The virtual environment is discarded at the end of the online session (block 508). For example, the backup module 124 may close the program used to create the virtual environment when a user closes a browser used to access the object. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computer-implemented method comprising:
    querying a service for a reputation associated with an object from an online source, responsive to selection of the object; and
    responsive to a determination that the reputation does not meet a threshold reputation level that is determined at least in part using heuristics:
       providing an estimated risk level associated with the object;
       storing a backup of a client for restoring the client that is to receive the object prior to obtaining the object; and
       obtaining the object after the backup of the client is stored.

2. A computer-implemented method as described in claim 1, wherein the object is one or more of:
    a program,
    an application,
    a plug-in, or
    web content.

3. A computer-implemented method as described in claim 1, further comprising sending a notification that the reputation does not meet the threshold reputation level.

4. A computer-implemented method as described in claim 1, further comprising isolating an automatic backup of the client, which is scheduled to occur after the object is obtained, when the reputation does not meet the threshold reputation level.

5. A computer-implemented method as described in claim 4, wherein the isolating includes suspending the automatic backup.

6. A computer-implemented method as described in claim 1, wherein the backup of the client is stored external to the client.

7. A computer-implemented method as described in claim 1, further comprising sending a notification, that recommends restoration of the client with the backup of the client when the reputation does not meet the threshold reputation level.

8. A system comprising:
    a reputation module configured to query a service for a reputation associated with an object requested in an online session by a client, the reputation based at least in part on heuristics; and
    a backup module configured to automatically create a virtual environment such that the object is isolated, within the virtual environment, from a backup of data of the client for restoring the client to a state represented in the backup of the data of the client, the backup of the data of the client is created and stored responsive to a determination that the reputation does not meet a threshold reputation level and prior to receiving the object, the backup module further configured to suspend an automatic backup of the client that is scheduled to occur after the object is obtained.

9. A system as described in claim 8, wherein the object is one or more of:
    web content associated with a uniform resource locator,
    an application, or
    a plug-in.

10. A system as described in claim 8, wherein the backup module is configured to discard the virtual environment upon termination of an online session with a source that contains the object.

11. A system as described in claim 8, wherein the backup module is configured to send a notification that offers to restore the client to the state represented in the backup of the data of the content, responsive to a determination that the client is infected with malware.

12. A system as described in claim 8, wherein the reputation module is configured to cache a response to the query in the client.

13. A system as described in claim 8, wherein the backup module is configured to isolate a copy of the backup of the data of the client remote from the backup of the data of the client that is stored on the client.

14. One or more computer-readable memory devices comprising instructions that are executable to generate a service that is operable to:
    query for a reputation associated with web content that is designated by a uniform resource locator (URL) before the web content is accessed, the reputation based at least in part on heuristics; and
    if the reputation meets a threshold reputation level for a client, then:
       access the web content;
    if the reputation does not meet the threshold reputation level for the client, then:
       store a backup of data of the client to restore the client to a state before the web content was accessed;
       provide an estimated risk level associated with the web content; and
       access the web content after the backup of the data of the client is stored and the estimated risk level is provided.

15. One or more computer-readable memory devices as described in claim 14, wherein the service is installed on the client.

16. One or more computer-readable memory devices as described in claim 14, wherein the threshold reputation level is set by the client.

17. One or more computer-readable memory devices as described in claim 14, wherein the backup of the data of the client is stored locally with the service.

18. One or more computer-readable memory devices as described in claim 15, wherein the service is configured to create a virtual environment within the client to browse the web content, in which the virtual environment is discarded when a browser, used to output the web content, is closed.

* * * * *